May 8, 1923.

C. DE C. MATULICH

ELECTRIC KETTLE

Filed Aug. 22, 1922

1,454,448

Inventor

Charles de Courcy Matulich by his Attorney

Patented May 8, 1923.

1,454,448

UNITED STATES PATENT OFFICE.

CHARLES DE COURCY MATULICH, OF HENLEY BEACH, SOUTH AUSTRALIA, AUSTRALIA.

ELECTRIC KETTLE.

Application filed August 22, 1922. Serial No. 583,471.

*To all whom it may concern:*

Be it known that CHARLES DE COURCY MATULICH, a subject of His Majesty the King of Great Britain, residing at Esplanade, Henley Beach, in the State of South Australia and Commonwealth of Australia, has invented certain new and useful Improvements in Electric Kettles, of which the following is a specification.

My invention relates to an improved electric kettle and is applicable for the boiling of water, the expression, kettle, being used hereinafter to cover and embrace water containers of various sizes and shapes. The object of the invention is to provide means whereby water can be very quickly raised in temperature under the influence of electricity with but little difficulty, but the device is not of the type known as immersent heaters.

I am aware that metallic boiling appliances fitted with electrical apparatus have hitherto been used and I am also aware that zinc and other metallic electrodes are likewise immersed in metallic or other vessels for heating purposes but the results obtained have been characterized by certain defects such as the contamination of the water, and the danger of electric shock consequent upon the use of a metallic container; but the object of my invention is to avoid these defects and to produce an efficient, safe and quick boiler.

In carrying my invention into effect I construct a kettle or other container of any suitable size or shape which is made of insulating material such as earthenware or porcelain or other non-metallic substance of similar nature and in the interior of such kettle or boiler I arrange suitable supports or carriers for the electrodes which consist of carbon rods preferably arranged diagonally across the vessel, supports being provided inside of the container for their lower ends, their upper ends being so arranged as to enable electric plugs or terminals to be fitted in the ordinary way.

In my invention there is no metallic material used in the container which is in itself an insulator and the only metal used in connection with the electric current is fitted in such a manner that neither the water of the container nor the steam arising therefrom can possibly reach the metallic contact pins which are external to the container.

But in order that my invention may be more clearly understood I will now describe the same by aid of the accompanying illustrative drawings wherein:—

In each of the illustrations similar letters of reference are used to denote similar or corresponding parts wherever they occur.

Figure 1:
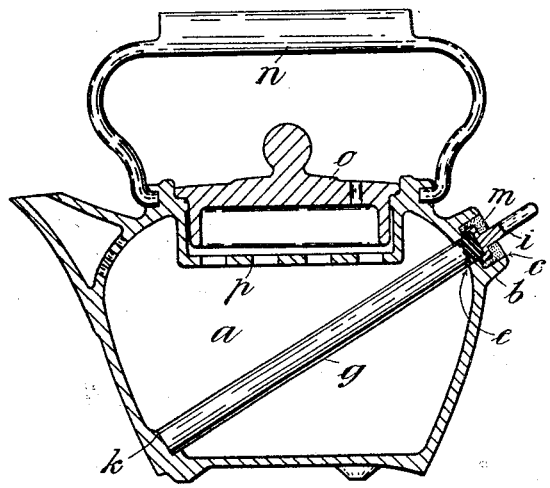
Fig. 1 is a sectional side elevation of the complete structure.
Figure 2:
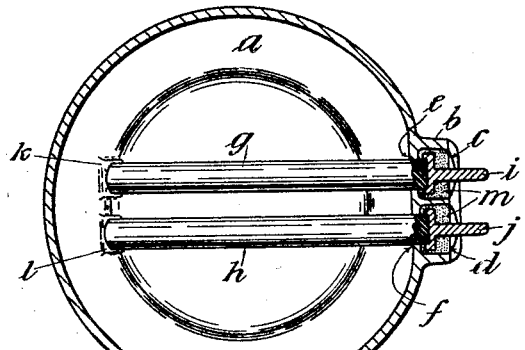
Fig. 2 is a sectional plan of Fig. 1 drawn approximately through the centre of the electrical fittings.
Figure 3:
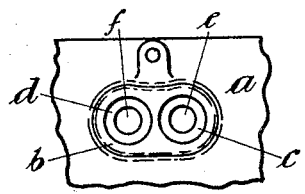
Fig. 3 is a plan view of portion of the back of the kettle in which the electrical elements are mounted.

In the drawings $a$ is the body of the container which is made of earthenware or porcelain or any other insulating material and if so desired may be subsequently enameled or glazed. At the rear of the kettle and in most cases near to the top thereof I construct an integrally formed or attached boss or projection $b$ in which in its preferred form there are two cells $c$ and $d$ between which an insulating wall of the earthenware or porcelain may naturally remain.

Within this boss or projection I provide two holes $e$ and $f$ for the reception of the positive and negative electric elements $g$ and $h$, said elements being of non-metallic material and for the purposes of my invention I prefer to use carbon. The upper portion of the carbon elements may be coated with a film of copper which is applied by any known means such film being only applied to the extreme ends of the carbons which project into the cells $c$ and $d$ beyond the container and to the ends so treated the adapter plugs $i$ and $j$ are soldered, clamped, or screwed.

The length of the carbon elements is such that their free ends rest upon the footings $k$ and $l$ of any convenient design which are arranged in the interior of the container. The cells which are formed in the boss or extension are adapted to receive a body of cement $m$ which is impervious to water or steam, the arrangements being such that the cement passes round and under the adapter plugs and is pressed sufficiently to cause it to come into contact with the carbon elements as indicated in the drawings.

I provide a handle of suitable design such as $n$ which is fitted to the top of the kettle and a removable lid $o$, and beneath the opening which is exposed when the lid is removed I construct a non-metallic grid such as $p$ which enables water to be placed in the container but protects the elements $g$ and $h$ from interference.

In applying my invention to practical use the kettle is filled with water and the electric current is conducted to the contact pins $i$ and $j$ by means of ordinary insulated wires.

This enables the current to be circuited through the water between the carbons thus raising the temperature to boiling point in a very short period, an alternating current being used for this purpose.

It will of course be understood that my container may be of various sizes and shapes but its interior and preferably the whole of the body is made of earthenware, porcelain or other insulating material so that no structural metallic element is in contact with the water contained therein.

I claim:

1. In an improved electric kettle a container constructed of insulating material and having a boss or extension provided thereon through which holes are formed for the accommodation of electric elements.

2. In an improved electric kettle wherein a container constructed of insulating material is furnished with a boss or extension for the accommodation of electric elements, sockets or rests for the support of the lower ends of such elements.

3. In an improved electric kettle a boss or extension having a suitable recess formed therein adapted to receive two electric elements of carbon, portions of contact pins and a body of impervious cement.

4. In an improved electric kettle a container manufactured of refractory material in combination with carbon elements which are a fixture in the container and are connected with electric current for boiling water.

5. In an improved electric kettle a grid or cover of insulating material arranged beneath the lid or opening of the kettle and adapted to protect the electric elements from damage.

In testimony whereof he has affixed his signature.

CHARLES de COURCY MATULICH.